Figure 1:
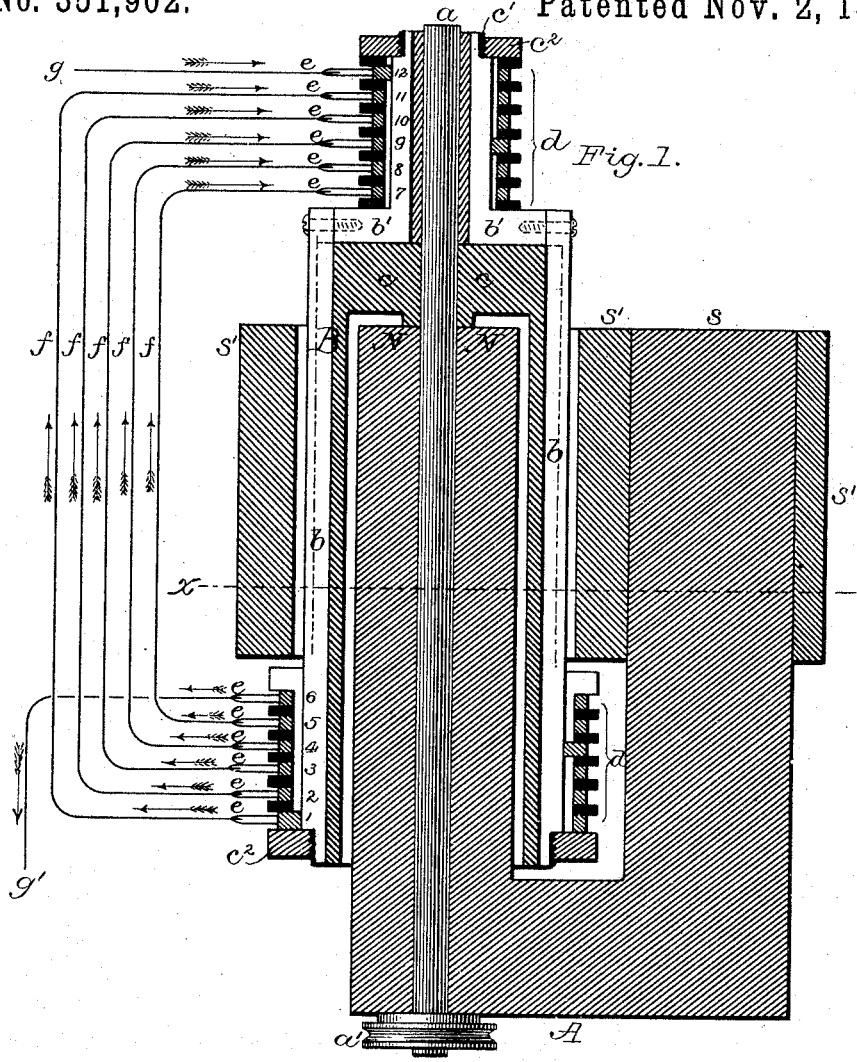

(No Model.) 3 Sheets—Sheet 1.

R. EICKEMEYER.
MAGNETO ELECTRIC AND ELECTRO MAGNETIC MACHINE.

No. 351,902. Patented Nov. 2, 1886.

Attest:
Philip F. Larner
Howell Bartlett

Inventor:
Rudolf Eickemeyer
By McLeod
Attorney.

(No Model.) 3 Sheets—Sheet 2.
R. EICKEMEYER.
MAGNETO ELECTRIC AND ELECTRO MAGNETIC MACHINE.
No. 351,902. Patented Nov. 2, 1886.
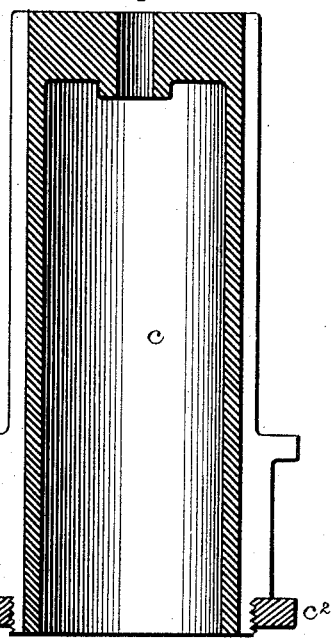
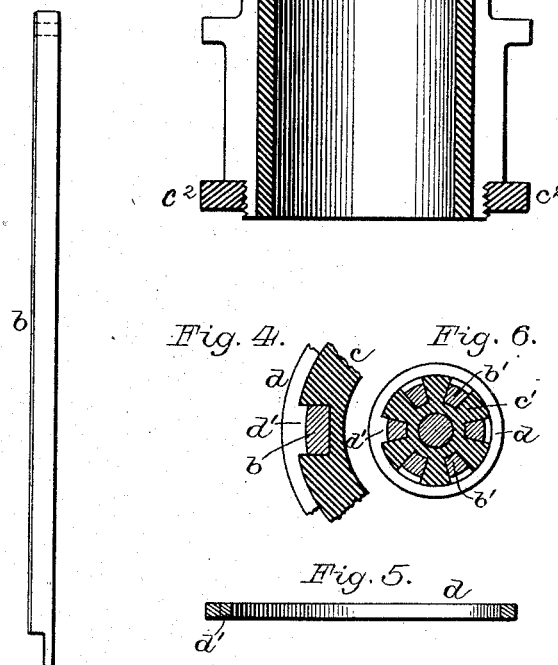
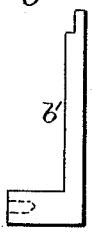
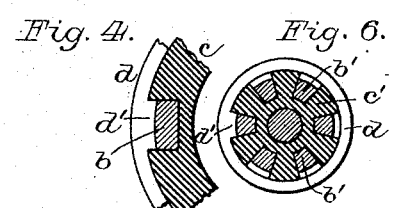
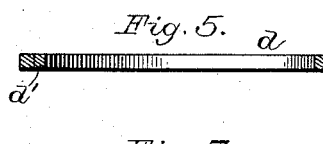
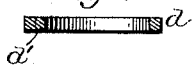
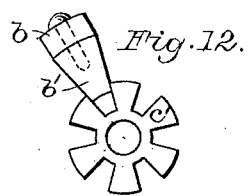
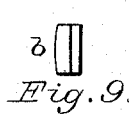
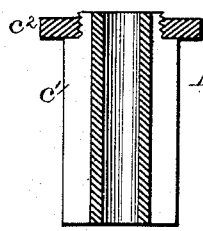
Attest:
Philip F. Larner
Howell Bartlett
Inventor:
Rudolf Eickemeyer
By Wm C Wood
Attorney.

(No Model.) 3 Sheets—Sheet 3.
R. EICKEMEYER.
MAGNETO ELECTRIC AND ELECTRO MAGNETIC MACHINE.
No. 351,902. Patented Nov. 2, 1886.
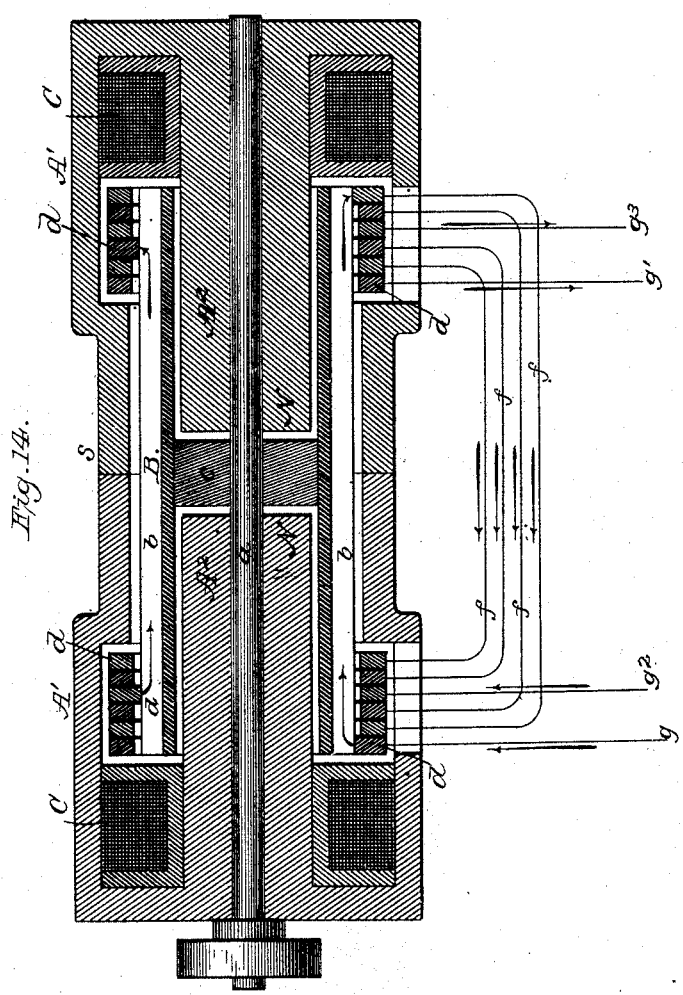

UNITED STATES PATENT OFFICE.

RUDOLF EICKEMEYER, OF YONKERS, NEW YORK.

MAGNETO-ELECTRIC AND ELECTRO-MAGNETIC MACHINE.

SPECIFICATION forming part of Letters Patent No. 351,902, dated November 2, 1886.

Application filed May 14, 1883. Serial No. 94,900. (No model.)

*To all whom it may concern:*

Be it known that I, RUDOLF EICKEMEYER, of Yonkers, in the county of Westchester and State of New York, have invented certain new and useful Improvements in Magneto-Electric and Electro-Magnetic Machines; and I do hereby declare that the following specification, taken in connection with the drawings furnished and forming a part of the same, is a clear, true, and complete description of my invention.

The machines herein illustrated and described embody a series of bars or conductors, which are caused to rotate across radial lines of force in a magnetic field between concentric magnetic poles, as set forth and broadly claimed in my application for Letters Patent filed November 8, 1882; and several of the machines shown and described in my said prior application contain features which are now made the specific subject of this application, it being my intent that such claims as are now made by me shall be subordinated to appropriate claims to which I deem myself entitled under my said prior application.

After fully describing the machine illustrated in the drawings, the several features of invention intended to be embraced within this application will be specified in detail in the several clauses of claims hereunto annexed.

Figure 2:
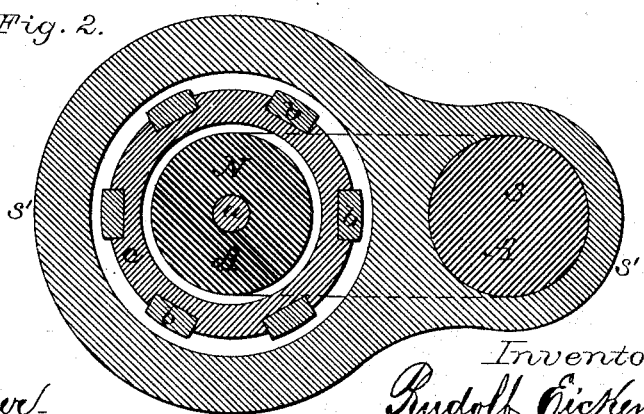

Referring to the drawings, Figure 1 is a central horizontal section of a machine embodying my said improvements. Fig. 2 is a vertical section of the same on line $x$. Fig. 3 is a longitudinal central section of the armature-shell, detached. Figs. 4 and 5 are partial views of the main armature shell, a conducting-bar, and a large conducting-ring. Fig. 6 is a sectional view of an insulating-hub on the armature, its conducting-bars, and a conducting-ring. Fig. 7 is a diametrical section of the small conducting-ring shown in Fig. 6. Figs. 8 and 9 are respectively a side and an end view of a long conducting-bar, detached. Figs. 10 and 11 are respectively a side and an end view of a short conducting-bar, detached. Fig. 12 is an end view of the insulating-hub, short conducting-bar, and long conducting-bar. Fig. 13 is a longitudinal sectional view of the hub. Fig. 14, Sheet 3, illustrates in section a machine in which complex magnets, having a pair of stationary inner poles, are surrounded by the conducting-bars of one armature.

The magnet A has novel concentric pole-pieces, but is otherwise of the horseshoe form. Its poles are indicated, respectively, at N and S; but the latter pole is extended laterally by means of an annular cheek-piece, S', so as to surround the N pole and afford an intervening annular field of force. The N pole leg of the magnet is longitudinally bored centrally, to afford a bearing for the revolving shaft $a$, having at one end a driving-pulley, $a'$. Mounted upon and secured to said shaft $a$ is the revolving armature B, composed of a number of longitudinal bars or conductors, $b$, insulated from each other, and mounted firmly upon a cylindrical support or shell, $c$, composed of suitable rigid insulating material, longitudinally grooved to snugly receive the bars $b$, and said shell at one end is locked or keyed to the shaft. The bars $b$, here shown are six in number; but more or less of them may be employed. At one end of the shell $c$ a hub, $c'$, is also mounted on the shaft $a$, and said hub practically serves as, and is in substance, an endwise extension of said shell, and it is composed of similar insulating material, scored longitudinally, Figs. 6 and 13, to receive the short rectangular conducting-bars $b'$, (shown in Figs. 1, 10, 11, and 13,) to which the long bars $b$, at one end, are secured by screws, as shown, thus making each two bars $b$ and $b'$ a practically continuous bar or conductor, secured at its opposite ends by the clamping-rings $c^2$, composed of insulating material; or, if of metal, they are properly insulated from said bars. This combination of the pole pieces of one magnet, constructed and arranged as described to afford the intervening annular space or magnetic field of force, and the armature composed of separate bars or conductors, secured to annular insulating supports, and revolving in said annular space, constitutes an important and novel feature in this machine.

At each end of the armature there is a series of six conducting-rings, $d$, which are placed side by side, inclosing the bars; but they are respectively insulated from each other, and each ring in each series is wholly insulated from all of the bars but one. The rings $d$ at one end of the armature are much larger in diameter than those at the opposite end on the hub $c'$. As seen in Figs. 1 and 4, each bar $b$ is in electric communication with one of said rings by way of an integral lug or ear, $d'$, projecting inwardly from the proper ring, and each of the other rings of that series is, in like manner, connected with some one of said bars. At the opposite end of the armature the extensions $b'$ of the bars $b$ are in like manner electrically connected by the lugs $d'$ with the smaller conducting-rings of that series, as illustrated in Figs. 1, 6, and 7. The exterior surface or periphery of each ring is engaged by a brush, $e$, or equivalent device, for taking off electric currents, and each conducting-ring is coupled by way of its brush and an outside stationary conductor, $f$, with the proper conducting-ring at the opposite end of the armature, so that said bars are alternately connected one with the other, and therefore all of said bars constitute parts of one continuous electric circuit, so that the currents developed in or passing through said bars $b$ will pass toward the head of the magnet and away from pole N, and return in the opposite direction by way of the outside conductors, $f$. The two series of conducting-rings $d$ are numbered 1 to 6 and 7 to 12, respectively, and the brushes $h$, in contact therewith, are clearly shown. Assuming the working or line conductor $g$ to be coupled to the brush which is in contact with ring $d^{12}$, and the conductor $g'$ to be coupled to the brush which is in contact with ring $d^6$, with a direction of current as indicated by the arrows, the entering current to ring 12 will pass to the bar $b$ in contact therewith, thence to ring 1 *via* its bar to ring 11, thence *via* its bar to ring 2, thence *via* its bar to ring 10, thence *via* its bar to ring 3, thence to 9, and then to 4, as shown in Fig. 1, and so on until the departing current leaves by conductor $g'$ from ring 6. As thus described, if the conductors $g$ $g'$ were connected to a battery or other generator of electricity the armature would revolve and the machine operate as a motor, and with the armature revolved in the opposite direction, by means of power applied to the pulley $a'$, the electric current induced or generated will correspond in direction with that already described.

It will be seen that the shell $c$ is provided at its end with an annular shoulder, thus affording ample strength and bulk of material to receive and securely hold the ends of the bars $b$, and affording for the clamping-ring $c^2$ a strong firm seat, thus assuring a proper concentric relation of the bars with reference to the shaft $a$, and also to the coincident surfaces of the concentric pole-pieces.

It is obvious that the bars $b$, if extended to include the length of the bars $b'$, would involve the use of rings $d$ as large at that end as they are at the other end, but that by the use of said extension-bars $b'$, I am enabled to use smaller and lighter rings, and to materially reduce the weight of material carried by the shaft $a$, and said feature in construction constitutes one portion of my present improvements. There is also value in the combination, with the armature-shaft and the insulating material mounted thereon, of the conducting-bars and the clamping-rings by which said bars are secured at their ends, and that feature constitutes another portion of my present improvements.

It is obvious that instead of having all of the armature-bars connected to form one continuous circuit, as shown, any number of independent circuits, less than six, can be provided for, and that each circuit may include one or more of said bars.

On Sheet 2 I have illustrated in Fig. 14 a machine in which there are two electro-magnets, A', each having an interior stationary pole-piece, A², and between them is an annular field of force. The outer pole-pieces of these magnets are cylindrical, and the inner poles are somewhat less in length than the outer poles, so as to afford between them space for the reception of the hub or support $c$, which enables the armature B (embodying independent bar-conductors $b$, as before described) to be mounted on its shaft $a$. At each end of the machine, and housed within the metal of each magnet, is a helix, C, so wound that the two ends of each magnet will be oppositely polarized. As here shown, the two outer poles are S and the two inner poles are N, thus affording two annular fields of force occupied by the one armature. The insulated independent bars or conductors $b$ are provided with conducting-rings $d$, and with each ring a brush is employed in connection with stationary conductors $f$, for electrically coupling rings at opposite ends of the machine, as before described, two or more of said rings being connected with terminals $g$ and $g'$, so that all the conducting-bars will be connected in linear series, or so that any two or more of said bars will be so connected as to constitute separate or independent circuits—as, for instance, as shown in Figure 14, wherein another pair of terminals is shown at $g^2$ and $g^3$, thus providing for two independent circuits, each including three of the bars, thus enabling any one or more of the bars to afford a circuit for exciting the helices, if desired, wholly independent of the one or more circuits employed for outside service, when the machine is used as a generator; and if used as a motor the driving-current may also be applied in one circuit or in any number of circuits less than the number of conducting-bars in the armature. When the conducting-rings are thus located upon both ends of the armature-shell, special clamping-rings, as before described, may be employed; or the conducting-rings may alone be relied upon to also operate as clamping-rings.

The shells and cores of the magnets shown may obviously be made in sections of such form as will enable their ready separation and union and the placing of the armature and helices in proper position.

It will be seen that portions of the armature-conductors are radial to the axis of the armature, and it is to be understood that conductors which are essentially radial to said axis, and are located in an effective magnetic field, constitute in appropriate combinations the subjects of separate applications for Letters Patent. (See Serial Nos. 202,973 and 203,125.)

Having thus described my invention, I claim as new—

1. In an electro-magnetic or magneto-electric machine, the combination, substantially as hereinbefore described, of a stationary concentric magnet and two or more independent electric conductors which rotate across the radial magnetic lines of force between the poles of said stationary concentric magnet, substantially as described.

2. The combination, substantially as hereinbefore described, of the magnet having concentric pole-pieces affording an annular space or field of force and the revolving armature embodying a series of insulated longitudinal bars or conductors secured upon annular insulated supports mounted on an armature-shaft and revolving in said annular field of force.

3. The combination, substantially as hereinbefore described, of the concentric pole-pieces, the revolving armature embodying the series of longitudinal bars or conductors, conducting-rings respectively connected in pairs with each bar, and outside stationary conductors for coupling any two or more of said bars in continuous circuit, as set forth.

4. The armature consisting of the combination of the shaft, the insulated cylindrical shell and hub, and the connected bars on said shell and hub, substantially as described.

5. The combination of the armature-shaft, the insulating-shell, the conducting-bars, and clamping-rings at each end of said bars for securing them to the shell, substantially as described.

6. A dynamo-electric machine having two concentric magnet-heads, a cylinder provided with a series of longitudinal conductors revolving between the magnet-heads, each of said conductors having each end thereof connected, respectively, with electrical contacts arranged at each end of the concentric magnet-heads and connected with each other, substantially as described, whereby the current in continuous circuit will traverse the several conductors on said cylinder rotating between the concentric magnet-heads, as set forth.

RUDOLF EICKEMEYER.

Witnesses:
HENRY OSTERHELD,
GEORGE NARR.